United States Patent [19]

Minagawa et al.

[11] 4,145,333
[45] Mar. 20, 1979

[54] STABILIZED SYNTHETIC RESIN COMPOSITION

[75] Inventors: Motonobu Minagawa, Koshigawa; Yutaka Nakahara, Iwatsuki; Masayuki Takahashi, Tokorozawa, all of Japan

[73] Assignee: Argus Chemical Corporation, Brooklyn, N.Y.

[21] Appl. No.: 817,499

[22] Filed: Jul. 20, 1977

[30] Foreign Application Priority Data

Jul. 20, 1976 [JP] Japan .................................. 51-86274

[51] Int. Cl.² ........................... C08K 5/53; C07F 9/02
[52] U.S. Cl. .............................. 260/45.8 N; 252/404; 252/406; 260/45.95 D; 260/929; 260/930
[58] Field of Search ................ 260/45.95 D, 930, 929, 260/982, 45.7 PH, 45.7 P, 45.8 N; 252/404, 406

[56] References Cited

U.S. PATENT DOCUMENTS

| 3,510,507 | 5/1970 | Bown et al. .................. 260/45.95 D |
| 3,769,372 | 10/1973 | Spivack ................................. 260/930 |
| 3,839,506 | 10/1974 | Hechenbleikner et al. ..... 260/927 R |
| 3,962,377 | 6/1976 | Spivack ......................... 260/45.95 D |

Primary Examiner—V. P. Hoke
Attorney, Agent, or Firm—Otto S. Kauder

[57] ABSTRACT

Synthetic resins such as polyolefins, vinyl chloride polymers, ABS polymers, ethylene-vinyl acetate copolymers and polyesters are stabilized against deteriorating influences with new stabilizer compositions comprising certain hydroxyphenylalkylenephosphonic acid esters of polycarbocyclic polyhydroxy compounds having the general formula (1)

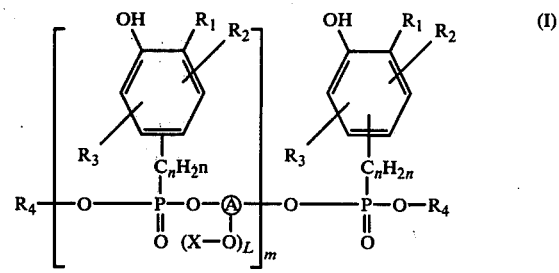

(wherein, $R_1$ denotes alkyl or cycloalkyl, $R_2$ and $R_3$ denote a hydrogen atom, alkyl or cycloalkyl. $R_4$ denotes alkyl, cycloalkyl, arylalkyl, aryl, alkylaryl, alkyl-polyoxyalkylene or a residue of polyhydricphenol. Ⓐ is a residue of polynuclearpolyhydric phenol or hydrogenated derivative thereof of from 2 to 4 valent. n is 1 to 8. m is 1 to 5. L is 0, 1 or 2. X is a hydrogen atom or

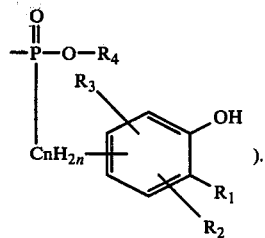

).

22 Claims, No Drawings

STABILIZED SYNTHETIC RESIN COMPOSITION

This invention relates to the stabilized synthetic resin composition, more particularly it relates to the synthetic resin composition stabilized against thermal oxidizing aging and deterioration of light.

We explain in detail the compounds indicated by the general formula (I) according to this invention.

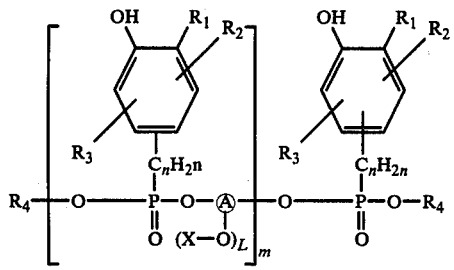

(wherein, $R_1$ denotes alkyl or cycloalkyl, $R_2$ and $R_3$ denote a hydrogen atom, alkyl or cycloalkyl. $R_4$ denotes alkyl, cycloalkyl, arylalkyl, aryl, alkylaryl, alkylpolyoxyalkylene or a residue of polyhydricphenol. Ⓐ is a residue of polynuclearpolyhydric phenol or hydrogenated derivative thereof of from 2 to 4 valent. n is 1 to 8. m is 1 to 5. l is 0, 1 or 2. X is a hydrogen atom or

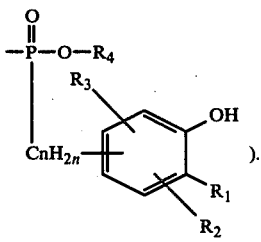

).

Among alkyl groups are included linear or branched alkyls having 1 to 14 carbon atoms such as methyl, ethyl, propyl, butyl, t-butyl, 2-ethylhexyl, octyl, decyl, dodecyl, tridecyl, tetradecyl, octadecyl and so on.

Cycloalkyl groups are for instance cyclopentyl, cyclohexyl, cyclooctyl, arylalkyl are for instance benzyl, phenylethyl. Aryl groups are phenyl and naphthyl, arylalkyl include methylphonyl, ethylphenyl, t-butylphenyl, octylphenyl, nonylphenyl. Alkylpolyoxyalkylene groups include methoxyethyl, methoxybutyl, ethoxyethyl, butoxyethyl, ethoxyethoxyethyl, butoxyethoxyethyl, methoxyethoxyethyl, dodecyloxyethyl, dodecyloxyethoxyethyl, dodecyloxyethyl, dodecyloxyethoxyethyl, dodecyloxyethoxyethoxyethyl and so on.

Among polynuclear-polyhydric phenol are included 4,4'-cyclohexylidene bisphenol, 4,4'-bis(2,6-di-t-butylphenol), 4,4'-methylene bis(2-methyl-6-t-butylphenol), 4,4'-methylene bis(3-methyl-6-t-butylphenol), bisphenol A, 4,4'-isopropylidene bis(2-phenylethylphenol), 4,4'-n-butylidene bis(3-methyl-6-t-butylphenol), 4,4'-cyclohexylidene bisphenol, 4,4'-cyclohexylidene bis(2-t-butylphenol), 4,4'-cyclohexylidene bis(2-cyclohexylphenol), 4,4'-benzylidene bis(2-t-butyl-5-methylphenol), 4,4'-oxo bis(3-methyl-6-isopropylphenol), 4,4'-thiobis(3-methyl-6-t-butylphenol), 4,4'-sulfobis(3-methyl-6-t-butylphenol), bis(2-methyl-4-hydroxy-5-t-butylbenzyl) sulfide, 4,4'-sulfobisphenol, 4,4'-thiobisphenol, 4,4'-thiobis(2-methyl-6-t-butylphenol), 4,4'-methylene bisphenol, 4,4'-oxobisphenol, 4,4'-isopropylidene bis(2-t-butylphenol), 1,1,3-tris(2'-methyl-4'-hydroxy-5'-t-butylphenyl)butane, 1-(3', 5'-di-t-butyl-4'-hydroxyphenyl)-3,3-bis(3''-t-butyl-4''-hydroxyphenyl)butane.

Table-1

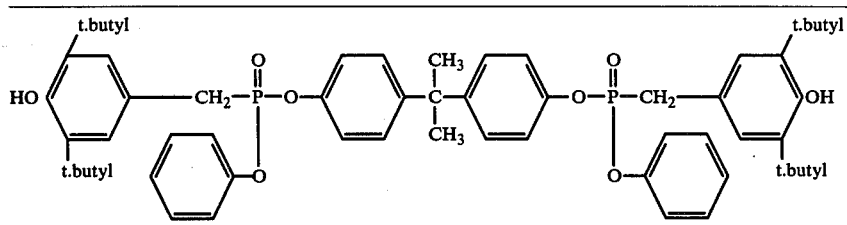

No. 1

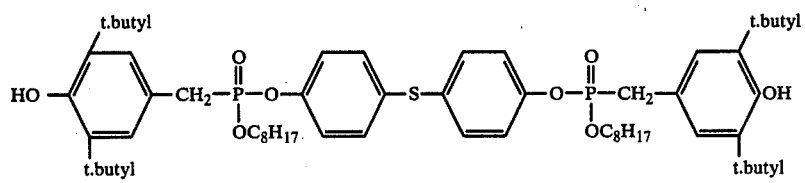

No 2

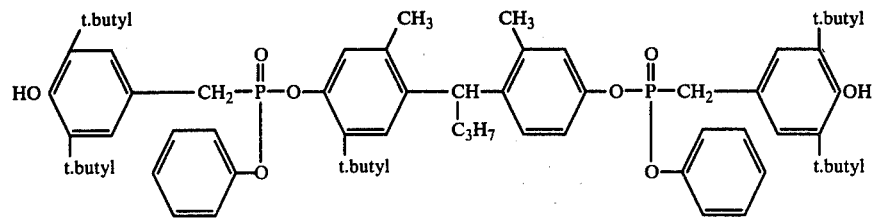

No. 3

Table-1-continued
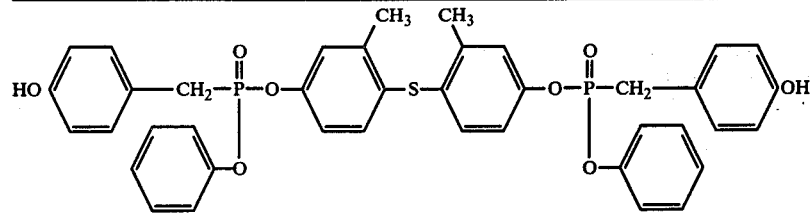
No. 4
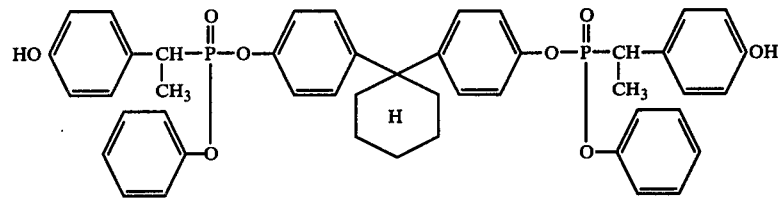
No. 5
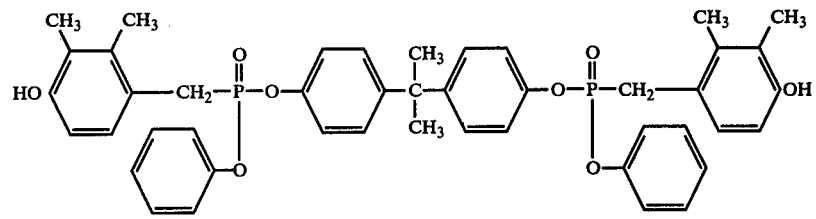
No. 6
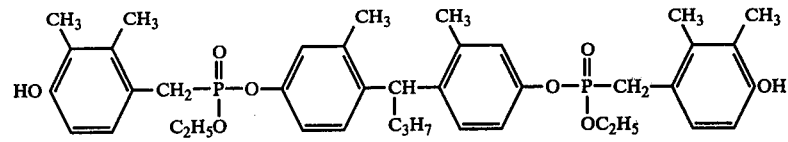
No. 7
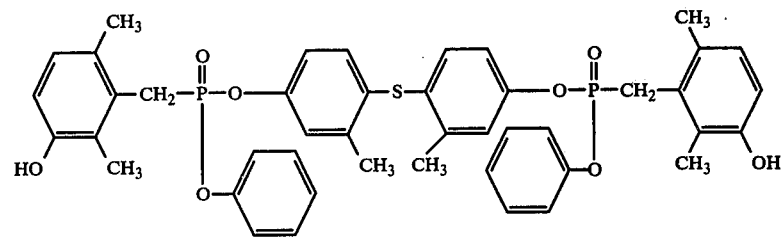
No. 8
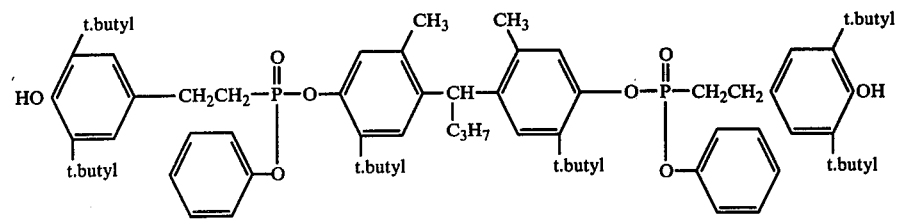
No. 9
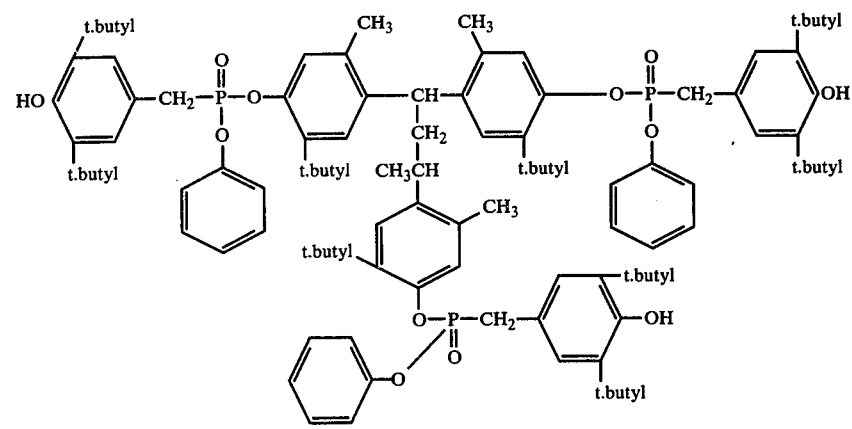
No. 10

Table-1-continued
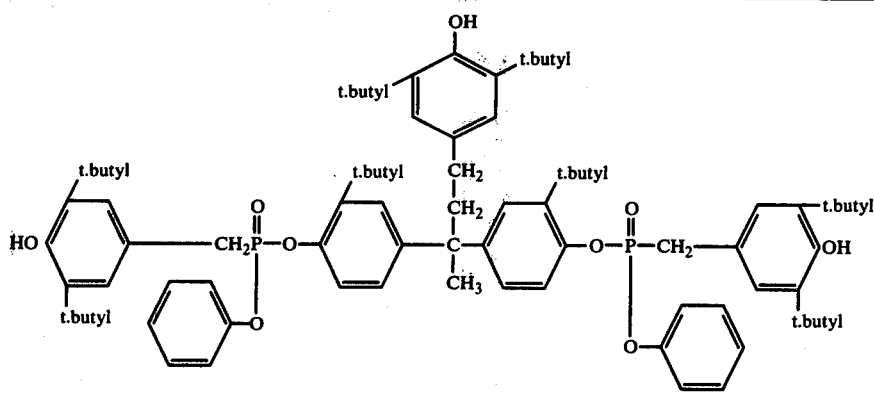
No. 11
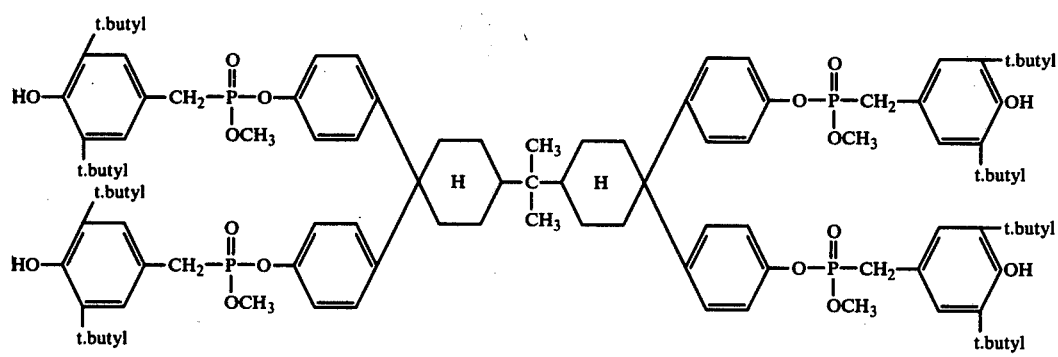
No. 12
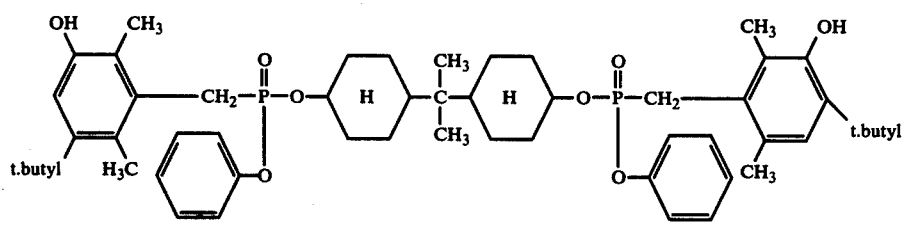
No. 13
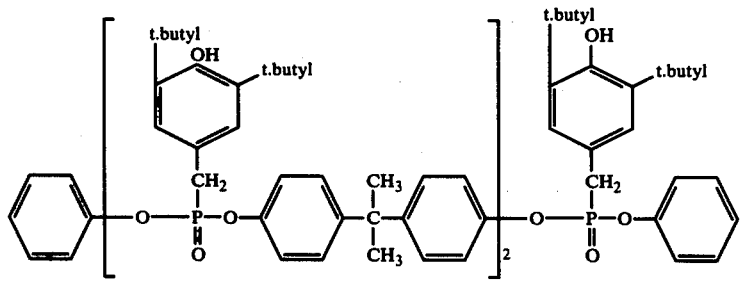
No. 14
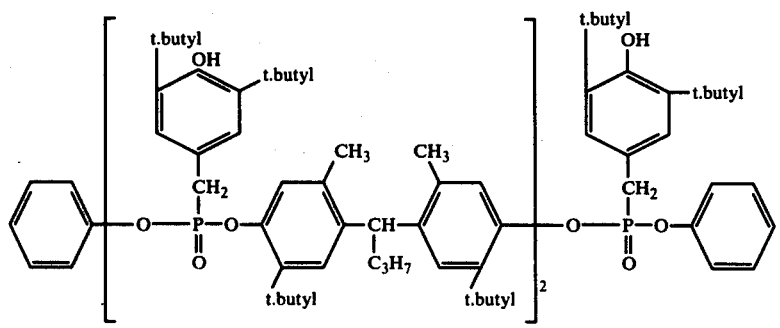
No. 15

Table-1-continued
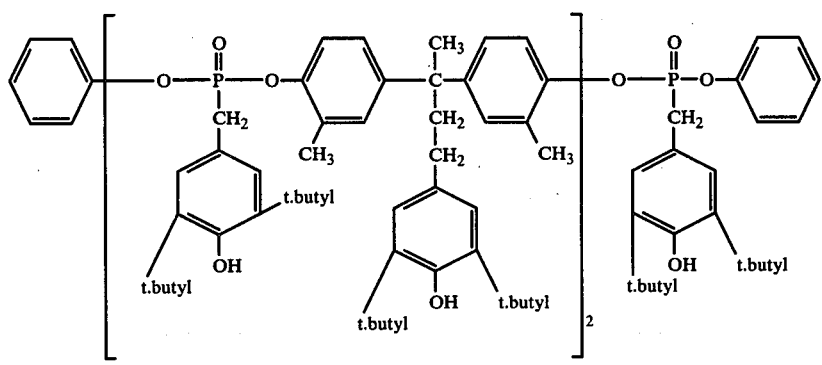
No.16
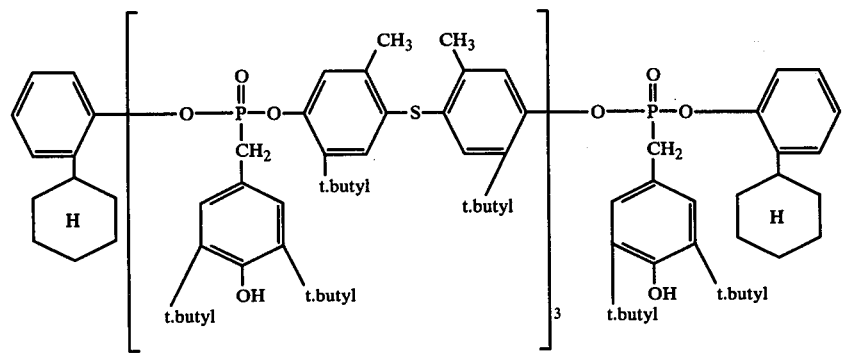
No. 17
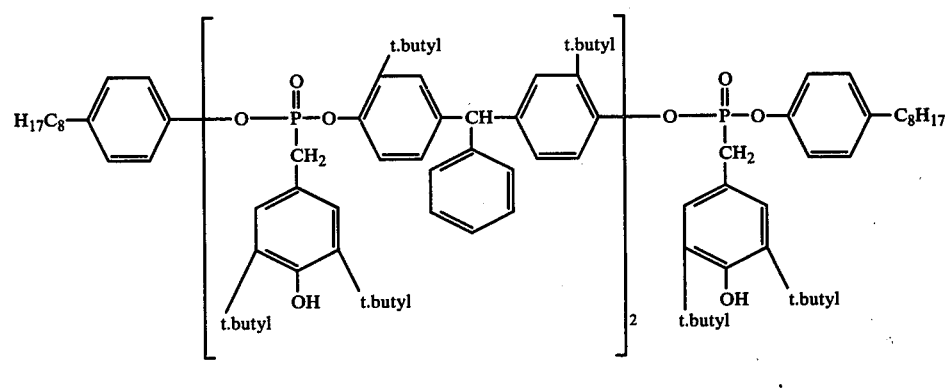
No.18
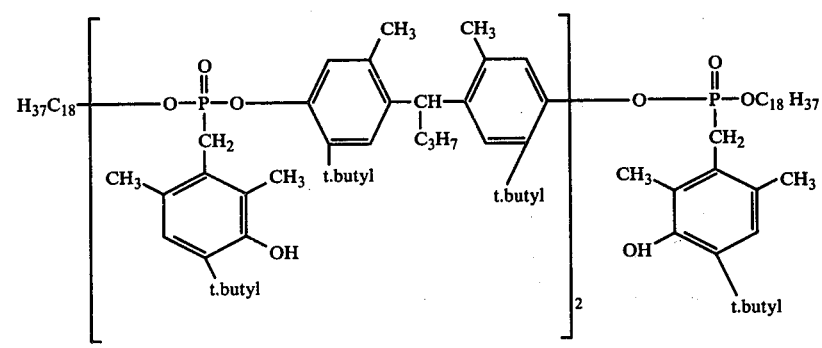
No.19

Table-1-continued

No.20

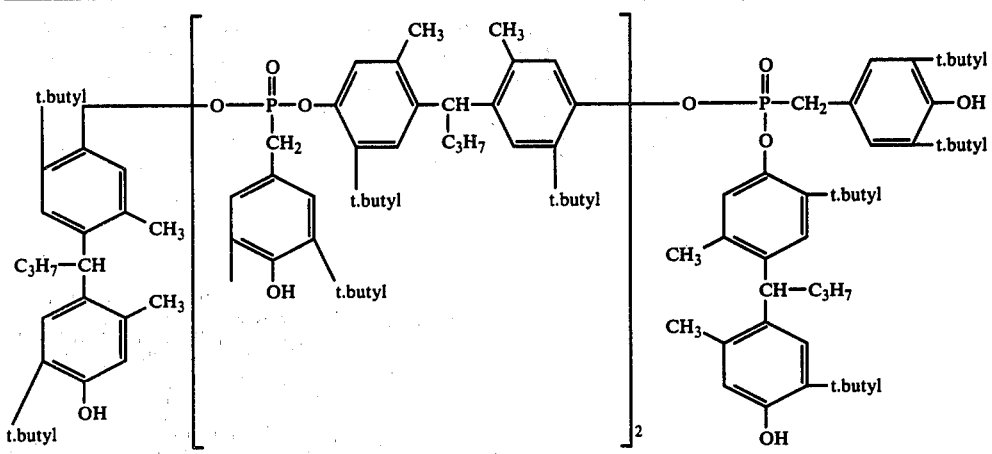

SYNTHETIC EXAMPLE - 1

Synthesis of No. 3 compound

Diphenyl-3,5-di-t-butyl-4-hydroxybenzyl phosphonate 45.2g (0.1mole), 4,4'-butylidene bis(3-methyl-6-t-butylphenol) 19.1g (0.05 mole) and sodium methoxide ($NaOH_3$) 1.28g were weighed, reacted at 170°–175° C. for 1 hr under the nitrogen stream, then distilled off the phenol in vacuo of max. 2 mmHg at 175°–180° C. After the reaction, glassy product was dissolved in benzene, washed with water, dried, distilled off the solvent and obtained light yellow glassy solid with melting point of 105°–110° C.

SYNTHETIC EXAMPLE - 2

Synthesis of No. 10 compound

Diphenyl-3,5-di-t-butyl-4-hydroxybenzyl phosphonate 81.4g (0.18 mole), 1,1,3-tris(2'-methyl-4'-hydroxy-5'-t-butylphenyl)butane 32.6g (0.06 mole) and $NaOCH_3$ of 2.2g were weighed and reacted at 170°–175° C. for one hr under the nitrogen stream, then distilled off the phenol in vacuo of max. 2 mmHg at 180°–185° C. After the reaction, glassy product was dissolved in benzene, washed with water, dried desolvated and obtained colorless glassy solid with melting point of 117°–124° C.

SYNTHETIC EXAMPLE - 3

Synthesis of No. 14 compound

Diphenyl-3,5-di-t-butyl-4-hydroxy benzyl phosphonate 67.8g. (0.15 mole), 4,4'-isopropylidene diphenol 22.8g (0.1 mole) and $NaOCH_3$ 1.81g were weighed and reacted at 165°–170° C. for 1 hrs under the nitrogen stream, then distilled off the phenol in vacuo of max. 2 mmHg at 175°–180° C. After cooling, glassy solid obtained was dissolved in benzene, washed with water, dried, desolvated and obtained light yellow glassy solid with melting point of 85°–91° C.

The loadings of the compounds according to the invention can be employed from 0.01 to 5 parts by weight to 100 parts by weight of synthetic resins, preferably from 0.05 to 3 parts by weight.

Synthetic resins include α-olefin polymer such as polyethylene, polypropylene, polybutene, poly-3-methylbutene, crosslinked polyethylene, or copolymer thereof such as ethylene-vinylacetate copolymer, ethylene-propylene copolymer and the like, halogenic polymer such as polyvinylchloride, polyvinylbromide, polyvinylfluoride, polyvinylidenechloride, chlorinated polyethylene, chlorinated polypropylene, polyvinylidene fluoride, brominated polyethylene, chlorinated rubber, or copolymer thereof with vinylacetate, ethylene, propylene, styrene, isoprene, isobutylene, or above halogenic monomer such as vinylchloride-vinylacetate copolymer, vinylchloride-ethylene copolymer and the like, and also vinylchloride-styrene-maleic anhydride terpolymer, vinylchloride-styreneacrylonitril copolymer and so on, polystyrene, polyvinylacetate, acrylic resins, or methacrylate resins, copolymer of styrene with the other monomer such as maleic anhydride, butadiene, acrylonitril, for example, acrylonitril-butadiene-stryrene copolymer, acrylic acid ester-butadiene-styrene copolymer, acrylic acid ester-butadiene-styrene copolymer, or polyvinylalcohol, polyvinylformal, polyvinylbutyral, linear polyester, polyamide, polycarbonate, polyacetal, polyurethane, cellulose resin, phenol resin, urea resin, melamine resin, epoxy resin, unsaturated polyester resin and so on.

An oxidizing stability can be improved by incorporating in this invention composition phenolic antioxidants, such as 2,6-di-t-butyl-p-cresol, stearyl-(3,5-di-methyl-4-hydroxybenzyl)thioglycolate, stearyl-β-(4-hydroxy-3,5-di-t-butylphenyl)propionate, distearyl(4-hydroxy-3-methyl-5-t-butyl)benzyl malonate, 2,2'-methylene bis(4-methyl-6-t-butylphenol), 4,4'-methylene bis(2,6-di-t-butylphenol), 2,2'-methylene bis[[6-(1-methylcyclohexyl)p-cresol], bis[3,3-bis(4-hydroxy-3-t-butylphenyl)-butyric acid]glycol ester, 4,4'-butylidene bis(6t-butyl-m-cresol), 1,1,3-tris(2-methyl-4-hydroxy-5-t-butylphenyl)-butane, 1,3,5-tris(3,5-di-t-butyl-4-hydroxy benzyl)isocyanurate, 2-octylthio-4,6-di(4-hydroxy-3,5-di-t-butyl)phenoxy-1,3,5-triazine, 4,4'-thiobis(6-t-butyl-m-cresol) and the like.

Also sulfur containing antioxidants can incorporate in the invention composition. Said anitioxidants include distearylthiodipropionate, dilaurylthiodipropionate, pentaerythritol tetrakis(β-laurylthiopropionate), 1,3,5-tris(β-stearylthiopropionyloxyethyl)isocyanurate.

Further resistance to light and heat can be improved by incorporating phosphite compounds, such as trioctylphosphite, trilaurylphosphite, tridecylphosphite, octyldiphenylphosphite, triphenylphosphite, tris(nonylphenyl)phosphite, distearylpentaerythritol diphosphite, tetra($C_{12-15}$ mixed alkyl)-4,4'-isopropylidene diphosphite, tris(3,5-di-t-butyl-4-hydroxyphonyl)phosphite, hydrogenated-4,4'-isopropylidene diphenol polyphosphite, phenyl-4,4'-isopropylidene diphenol pentaerythritol diphosphite, 4,4'-isopropylidene bis(2-t-butylphenol) di(nonylphenyl)phosphite and the like.

EXAMPLE - 1

Un-stabilized polypropylene resin (Profax 6501) 100 parts by weight was added 0.3 parts by weight of sample compound (Table-2) and were kneaded by grinding and mixing machine. This compound was milled at 180° C. for 6 minutes by mixing roll, then a sheet of 1.0 mm in thickness was prepared by compression molding at 180° C. and 200 kg/cm² for 5 minutes.

A specimen was cut from this sheet and measured heat stability in Geer oven at 160° C.
The results are shown in Table-2

Table - 2

| No. | Sample Compounds | Heat stability |
|---|---|---|
| Control | | |
| 1-1 | stearyl-3-(3,5-di-t-butyl-4-hydroxyphenyl) propionate | 145 hrs |
| 1-2 | BHT | 20 |
| 1-3 | distearyl-3,5-di-t-butyl-4-hydroxybenzyl-phosphonate | 180 |
| Example | | |
| 1-1 | No. 1 (Table-1) | 340 |
| 1-2 | No. 3 (") | 485 |
| 1-3 | No. 6 (") | 420 |
| 1-4 | No. 8 (") | 435 |
| 1-5 | No. 9 (") | 420 |
| 1-6 | No.11 (") | 450 |
| 1-7 | No.15 (") | 465 |
| 1-8 | No.17 (") | 450 |
| 1-9 | No.18 (") | 440 |

EXAMPLE - 2

A specimen was prepared in the same way as Example-1 according to the following formulation. Using the specimen, heat stability in Geer oven at 160° C. and resistance to light by irradiation of mercury lamp were measured.
The results are shown in Table-3.

| (Formulation) | |
|---|---|
| Un-stabilized polypropylene (Profax 6501) | 100 parts by weight |
| Ca-stearate | 0.2 |
| dilaurylthiodipropionate | 0.3 |
| bis(2,2,6,6-tetramethyl-4-piperidyl) sebacate | 0.3 |
| Sample (Table-3) | 0.1 |

Table - 3

| No. | Sample | Resistance to light | Heat Stability |
|---|---|---|---|
| Control | | | |
| 2-1 | none | 180 hrs | 20 hrs |
| 2-2 | 4,4'-butylidene bis(3,5-di-t--butylphenol) | 190 | 180 |
| 2-3 | pentaerythritol tetrakis-3-(3,5-di-t-butyl-4-hydroxyphenyl) propionate | 220 | 465 |
| 2-4 | diphenyl(3,5-di-t-butyl-4--hydroxybenzyl)phosphonate | 235 | 360 |
| Example | | | |
| 2-1 | No. 2 (Table-1) | 455 | 585 |
| 2-2 | No. 3 (") | 580 | 790 |
| 2-3 | No. 4 (") | 535 | 720 |
| 2-4 | No. 7 (") | 530 | 755 |
| 2-5 | No.10 (") | 645 | 835 |
| 2-6 | No.12 (") | 510 | 680 |
| 2-7 | No.13 (") | 465 | 600 |
| 2-8 | No.16 (") | 525 | 740 |

EXAMPLE - 3

Following formulation was milled on mixing roll at 150° C. for 5 minutes, then a sheet of 1.2 mm in thickness was prepared by carring out compression molding at 150° C., 180 kg/cm² for 5 minutes. This sheet was made to a specimen of 10 × 20 mm, measured heat stability of aluminum-foil in Geer oven at 150° C. and also measured resistance to light in weatherometer.
The results are shown in Table-4.

| (Formulation) | |
|---|---|
| Polyethylene (Hizex5100E) | 100 parts by weight |
| Distearylthiodipropionate | 0.3 |
| 2,6-Di-t-butyl-4-methylphenol | 0.1 |
| Sample (Table-4) | 0.1 |

Table - 4

| No. | Sample | | Resistance to light | Heat stability |
|---|---|---|---|---|
| Control | | | | |
| 3-1 | none | | 130 hrs | 155 hrs |
| 3-2 | 2-hydroxy-4-methoxybenzophenone | | 510 | 167 |
| Example | | | | |
| 3-1 | No. 1 | (Table-1) | 860 | 430 |
| 3-2 | No. 4 | " | 1020 | 522 |
| 3-3 | No. 5 | " | 910 | 447 |
| 3-4 | No. 7 | " | 980 | 503 |
| 3-5 | No. 9 | " | 1050 | 516 |
| 3-6 | No.10 | " | 1130 | 568 |
| 3-7 | No.11 | " | 1060 | 540 |
| 3-8 | No.14 | " | 940 | 475 |
| 3-9 | No.20 | " | 1020 | 534 |

EXAMPLE - 4

| ABS resin (Blendex 111) | 100 parts by weight |
|---|---|
| Zn-stearate | 0.5 |
| Sample (Table-5) | 0.3 |

The above compound was kneaded on roll and prepared a sheet of 0.5 mm in thickness by press. Using the sheet, degree of coloring the sheet after heating in Geer oven at 135° C. for 20 hrs was measured by Hunter Color meter and indicated by whiteness. Also measured tensile retention after irradiation by weatherometer 800 hrs.
The results are shown in Table-5.

Table - 5

| No. | Sample | Whiteness | Tensile Retention |
|---|---|---|---|
| Control | | | |
| 4-1 | phenylsalicylate | 0.11 | 38% |
| 4-2 | octyldiphenylphosphite | 0.15 | — |
| 4-3 | distearyl(3,5-di-t-butyl-4-hydroxybenzyl)phosphonate | 0.22 | 56 |
| Example | | | |
| 4-1 | No. 3 (Table-1) | 0.36 | 85 |
| 4-2 | No. 6 (Table-1) | 0.35 | 88 |
| 4-3 | No. 8 (Table-1) | 0.33 | 84 |
| 4-4 | No. 9 (Table-1) | 0.34 | 84 |
| 4-5 | No.10 (Table-1) | 0.38 | 91 |
| 4-6 | No.13 (Table-1) | 0.30 | 81 |
| 4-7 | No.15 (Table-1) | 0.35 | 87 |
| 4-8 | No.19 (Table-1) | 0.33 | 85 |

EXAMPLE - 5

Polyvinylchloride resin(Geon 103EP) 100 parts, dioctylphthalate 42 parts, epoxidized soybean oil 3 parts, zinc stearate 0.3 part, barium stearate 0.5 part, stearic acid 0.3 part and the sample compound (Table-6) 0.3 part were kneaded on mixing roll at 175° C. for 5 minutes, then a clear sheet was prepared by compression molding at 175° C. Heat aging test was carried out in Geer oven at the temperature of 190° C. in air-atmosphere, while time to age was judged by coloring. Also resistance to light was carried out in weatherometer. The results are shown in Table-6.

Table - 6

| No. | Sample | Time to begin aging Yellowed | Blacked | Resistance to light |
|---|---|---|---|---|
| Control | | | | |
| 5-1 | none | 30 min | 45 min | 110 hrs |
| Example | | | | |
| 5-1 | No. 2 (Table-1) | 60 | 75 | 450 |
| 5-2 | No. 4 (Table-1) | 75 | 85 | 510 |
| 5-3 | No. 6 (Table-1) | 70 | 85 | 530 |
| 5-4 | No. 7 (Table-1) | 65 | 85 | 560 |
| 5-5 | No. 8 (Table-1) | 70 | 80 | 490 |
| 5-6 | No.11 (Table-1) | 75 | 90 | 500 |
| 5-7 | No.15 (Table-1) | 70 | 85 | 530 |
| 5-8 | No.17 (Table-1) | 75 | 90 | 510 |

EXAMPLE - 6

| Polybutylene terephthalate | 100 parts by weight |
|---|---|
| Sample (Table-7) | 0.2 |

The above compound was processed by injection at 270° C. and prepared a specimen. Using the specimen, tensile retention after the irradiation of 500 hrs in weatherometer was measured, and also measured tensile retention after heat aging at 150° C. for 240 hrs. The results are shown in Table-7.

Table - 7

| No. | Sample | Tensile Retention After Irradiation | After Radiation |
|---|---|---|---|
| Control | | | |
| 6-1 | none | 51% | 58% |
| Ex. | | | |
| 6-1 | No. 3 (Table-1) | 82 | 81 |
| 6-2 | No. 5 (Table-1) | 74 | 72 |
| 6-3 | No. 6 (Table-1) | 80 | 79 |
| 6-4 | No. 8 (Table-1) | 77 | 76 |
| 6-5 | No. 9 (Table-1) | 78 | 81 |
| 6-6 | No. 10 (Table-1) | 83 | 84 |
| 6-7 | No. 12 (Table-1) | 76 | 73 |
| 6-8 | No. 16 (Table-1) | 78 | 77 |
| 6-9 | No. 19 (Table-1) | 77 | 80 |

EXAMPLE - 7

A sample was prepared according to the following formulation in order to examine the effects to ethylene-vinylacetate copolymer of the compounds according to the invention, and measured heat stability and initial color in Geer oven at 170° C. So as to initial color, yellowness was measured by Hunter Color meter.

Also measured tensile retention after the irradiation of 500 hrs in weatherometer.
The results are shown in Table-8.

| (Formulation) | |
|---|---|
| Ethylene-Vinylacetate Copolymer (Ultrasene UE630) | 100 parts |
| Montanic wax | 0.3 |
| Sample (Table-8) | 0.1 |

Table - 8

| No. | Sample | Tensile Retention | Heat Stability | Initial Color |
|---|---|---|---|---|
| Control | | | | |
| 7-1 | none | 51% | 60 min. | 0.34 |
| Example | | | | |
| 7-1 | No. 3 (Table-1) | 83 | 150 | 0.11 |
| 7-2 | No. 4 (Table-1) | 79 | 120 | 0.11 |
| 7-3 | No. 7 (Table-1) | 77 | 120 | 0.12 |
| 7-4 | No.10 (Table-1) | 82 | 150 | 0.10 |
| 7-5 | No.11 (Table-1) | 78 | 135 | 0.12 |
| 7-6 | No.14 (Table-1) | 74 | 105 | 0.15 |
| 7-7 | No.15 (Table-1) | 80 | 135 | 0.13 |
| 7-8 | No.18 (Table-1) | 81 | 120 | 0.12 |
| 7-9 | No.20 (Table-1) | 77 | 120 | 0.13 |

We claim:

1. An ortho-hydrocarbyl substituted hydroxyphenylalkylene-phosphonic acid ester of a polycarbocyclic polyhydroxy compound having the formula:

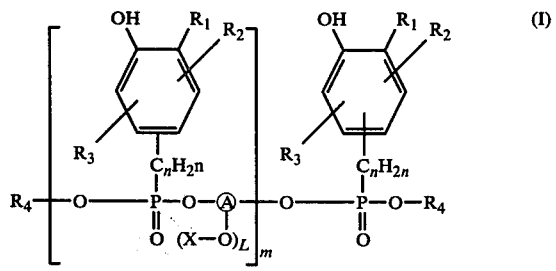

in which $R_1$ is an alkyl or cycloalkyl group; each of $R_2$ and $R_3$ independently are an alkyl or a cycloalkyl group or a hydrogen atom; $R_4$ is an alkyl, cycloalkyl, arylalkyl, aryl, alkylaryl, or alkylpolyoxyalkylene group or a residue of a polycarbocyclic polyhydric phenol having two to three benzenoid rings linked through at least one atom of carbon, oxygen or sulfur; A is a residue of a polycarbocyclic polyhydroxy compound having 2 to 4 hydroxyl groups and two to three six-membered rings linked through at least one atom of carbon, oxygen, or sulfur; X is a hydrogen atom or the group

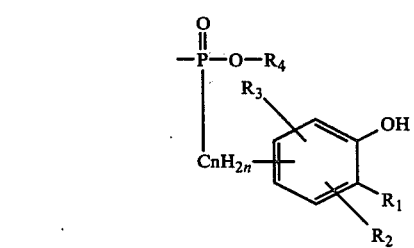

L is a number from 0 to 2, m is a number from 1 to 5, and n is a number from 1 to 8.

2. A hydroxyphenylalkylenephosphonic acid ester according to claim 1 in which the ortho-hydrocarbyl substituent is t-butyl.

3. A hydroxyphenylalkylenephosphonic acid ester according to claim 1 in which the polycarbocyclic polyhydroxy compound is a phenol.

4. A hydroxyphenylalkylenephosphonic acid ester according to claim 3 in which the phenol is an alkylidenebisphenol.

5. A hydroxyphenylalkylenephosphonic acid ester according to claim 3 in which the phenol is a thiobisphenol.

6. A hydroxyphenylalkylenephosphonic acid ester according to claim 3 in which the phenol is a trisphenol.

7. A hydroxyphenylalkylenephosphonic acid ester according to claim 1 in which $R_4$ is phenyl.

8. A hydroxyphenylalkylenephosphonic acid ester according to claim 1 in which $R_4$ is alkyl having 1 to 24 carbon atoms.

9. A hydroxyphenylalkylenephosphonic acid ester according to claim 1 in which n is one.

10. A hydroxyphenylalkylenephosphonic acid ester according to claim 1 which is an ester of 3,5-di-t-butyl-4-hydroxybenzylphosphonic acid.

11. A hydroxyphenylalkylenephosphonic acid ester according to claim 1 which is 4,4'-n-butylidenebis(2-t-butyl-5-methylphenol)bis(3,5-di-t-butyl-4-hydroxybenzylphosphonic acid phenyl ester) having the formula:

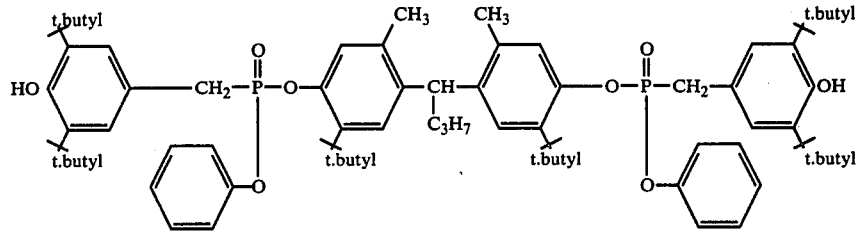

12. A hydroxyphenylalkylenephosphonic acid ester according to claim 1 which is 1,1,3-tris(2-t-butyl-5-methylphenyl)butane tris(3,5-di-t-butyl-4-hydroxybenzylphosphonic acid phenyl ester) having the formula:

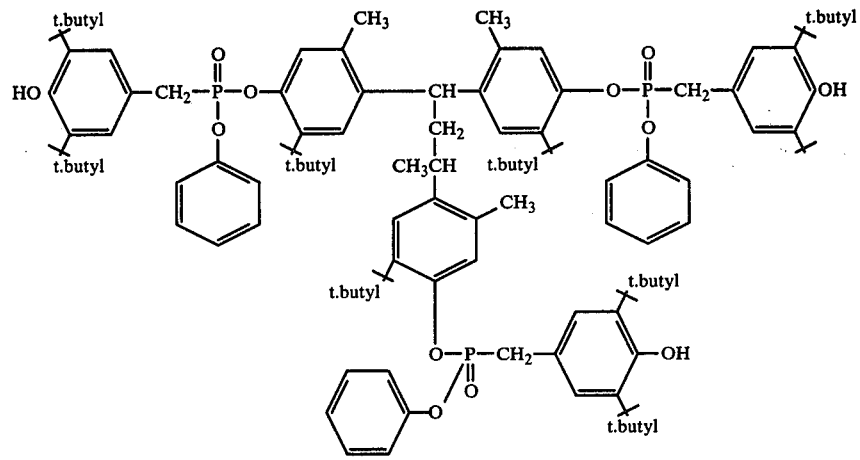

13. A hydroxyphenylalkylenephosphonic acid ester according to claim 1 which is a phenyl terminated 4,4'-isopropylidenediphenol 3,5-di-t-butyl-4-hydroxybenzylphosphonic acid oligoester having the formula:

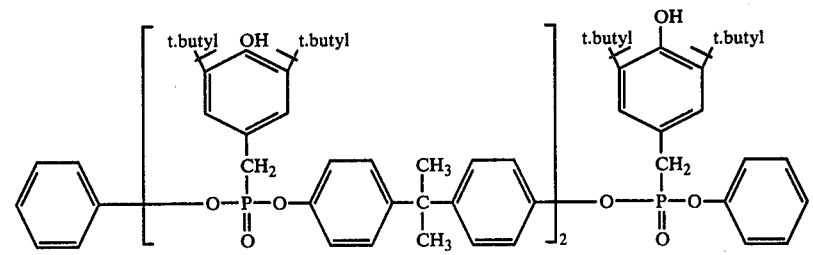

14. A stabilizer composition for enhancing the resistance to deterioration on exposure to heat and light of a synthetic resin, comprising a synthetic resin stabilizer selected from the group of phenolic antioxidants, sulfur antioxidants, bis-(2,2,6,6-tetramethyl-4-piperidyl)sebacate, organic phosphites, epoxidized oils, and monocarboxylic acid salts of Group II metals, and a hydroxyphenylalkylene phosphonic acid ester according to claim 1.

15. A stabilizer composition according to claim 14 in which the synthetic resin stabilizer is 2,6-di-t-butyl-p-cresol.

16. A stabilizer composition according to claim 14 in which the synthetic resin stabilizer is dilauryl thiodipropionate.

17. A stabilizer composition according to claim 14 in which the synthetic resin stabilizer is distearyl thiodipropionate.

18. A stabilizer composition according to claim 14 in which the synthetic resin stabilizer is epoxidized soybean oil.

19. A synthetic resin composition having enhanced resistance to deterioration on exposure to heat and light comprising a synthetic resin selected from the group consisting of ethylene-vinyl acetate copolymers, alkanediolterephthalate linear polyesters, polyvinyl chloride, acrylonitrile-butadiene-styrene polymer, and olefin polymers, and a hydroxyphenylalkylenephosphonic acid ester according to claim 1.

20. A synthetic resin composition according to claim 19 in which the synthetic resin is polypropylene.

21. A synthetic resin composition according to claim 19 in which the synthetic resin is polybutylene terephthalate.

22. A stabilizer composition according to claim 14 in which the synthetic resin stabilizer is bis(2,2,6,6-tetramethyl-4-piperidyl)sebacate.

* * * * *